US006934111B2

United States Patent
Krause et al.

(10) Patent No.: US 6,934,111 B2
(45) Date of Patent: Aug. 23, 2005

(54) SYSTEM, METHOD, AND APPARATUS FOR TESTING A HEAD GIMBAL ASSEMBLY

(75) Inventors: Rainer Klaus Krause, Mainz (DE); Edgar Maehringer-Kunz, Muenster-Sarmasheim (DE)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 168 days.

(21) Appl. No.: 10/614,979

(22) Filed: Jul. 8, 2003

(65) Prior Publication Data

US 2004/0036996 A1 Feb. 26, 2004

(30) Foreign Application Priority Data

Jul. 9, 2002 (EP) .......................................... 02015238

(51) Int. Cl.⁷ .............................................. G11B 21/02
(52) U.S. Cl. .................... 360/75; 360/78.14; 360/244.8
(58) Field of Search ........................ 360/75, 69, 78.04, 360/244.2, 244.8, 245, 245.2

(56) References Cited

U.S. PATENT DOCUMENTS

| | | | | |
|---|---|---|---|---|
| 5,661,615 | A | * | 8/1997 | Waugh et al. ................. 360/75 |
| 6,504,670 | B1 | * | 1/2003 | Dittmar .................... 360/78.04 |
| 6,687,091 | B1 | * | 2/2004 | Chen et al. ............... 360/244.8 |
| 6,690,534 | B2 | * | 2/2004 | Ding et al. ............... 360/78.06 |
| 6,697,225 | B2 | * | 2/2004 | Wittig et al. ............. 360/244.9 |
| 6,765,749 | B2 | * | 7/2004 | Galloway et al. ......... 360/78.04 |
| 2002/0176192 | A1 | * | 11/2002 | Chung .......................... 360/46 |
| 2003/0206365 | A1 | * | 11/2003 | Ho et al. ................. 360/78.04 |
| 2004/0039760 | A1 | * | 2/2004 | Hess et al. ................... 708/100 |

* cited by examiner

*Primary Examiner*—David Hudspeth
*Assistant Examiner*—James L. Habermehl
(74) *Attorney, Agent, or Firm*—Bracewell & Giuliani LLP

(57) ABSTRACT

The invention relates to a method and a system for testing a head gimbal assembly, the system comprising means (54) for inputting a control command to perform a long seek operation, means (55) for measuring the mechanical frequency response of the head gimbal assembly to the long seek operation, and means (57) for comparing the frequency response to a master frequency response (58).

18 Claims, 5 Drawing Sheets

SYSTEM, METHOD, AND APPARATUS FOR TESTING A HEAD GIMBAL ASSEMBLY

This application claims the priority of European Patent No. 02015238.5, filed on Jul. 9, 2002, and entitled "A Method and System for Testing a Head Gimbal Assembly and Head Gimbal Assembly."

BACKGROUND OF THE INVENTION

1. Technical Field

The present invention relates to a method and apparatus for testing a head gimbal assembly and to a head gimbal assembly. More particularly, the present invention relates to the use of a laser-based system for testing of a head gimbal assembly.

2. Description of the Related Art

In an assembly or a fabrication of a head supporting arm used in a magnetic data recording device, such as a hard disk drive device, a very small slider, a read/write head is attached, or bonded to a flexure by an adhesive, such as a thermosetting resin. FIG. 1 shows a prior head supporting arm 1 which includes an actuator arm 2 which has a pivot point 3 mounted on a frame of the hard disk drive device, a load beam 4, a mount plate 5 connecting the load beam 4 with the actuator arm 2, a flexure 6 attached to the load beam 4, and a slider 7 mounted on the flexure 6. The mount plate 5 and the actuator arm 2 are coupled by a swaging connection 8. The slider 7, the flexure 6, the load beam 4 and the mount plate 5 are called as a head gimbal assembly (HGA).

A flexible tube 9 containing four connecting wires 10 connected to a read/write head 13, such as a MR head, shown in FIG. 2, on the slider 7 is mounted on one of the side edges of the head supporting arm. The tube 9 is fixed to the side edge at plural positions by fixing elements 11. This type of head supporting arm is used in a contact start stop (CSS) scheme in which the slider 7 is landed on an outer landing zone of the surface of a data recording disk, such as a hard disk, when the rotation of the hard disk is stopped during a standby condition. When the rotation of the hard disk is started to read the data from the hard disk or to write the data onto the hard disk, the slider 7 takes off from the landing zone and flies above the hard disk.

The FIG. 2 shows a positional relationship of a front end of the load beam 4, the flexure 6 and the slider 7. A dimple 12 formed on the back surface of the load beam 4 contacts an upper surface of the flexure 6 to realize a gimbal action of the slider 7. In the assembling process, the flexure 6 is fixed on a back surface of the load beam 4, and the slider 7 is attached on a back surface of the flexure 6 by the thermosetting resin 15.

The cure of the entire thermosetting resin is performed in an oven. Before the heating in the oven, a laser beam is applied in a small area 16 of the exposed area 14 of the flexure 6 to cure the thermosetting resin in the area 16 for tacking the slider 7 onto the flexure 6. This tack is called as a laser tack. Such laser tack becomes possible in the head supporting arm 1 used in the CSS scheme since the portion 16 is exposed in the such arm 1.

U.S. Pat. No. 6,282,064 B1 shows a head gimbal assembly comprised of a load beam, a pair of flexure arms, a slider support member and a plurality of electrical lines. The head gimbal assembly is formed from a laminated material comprised of a support layer, a dielectric layer and a high strength electrically conductive layer.

A variety of other head gimbal assemblies and head stack assemblies is known from the prior art. However, regardless of the type of drive, during operation the disk rotates about its axis, while the actuator arm moves the r/w head across the disk. The actuator arm moves the r/w head to different areas of the disk to allow the r/w head to read data from and write data to the disk. The disk itself is divided into a number of concentric tracks each having the same width. These tracks are in turn divided into a number of sectors. In seeking out a particular track, the actuary head moves in a radial direction from its current location to the location of the track in which the data sector it is seeking is located.

For the r/w head to operate properly, it should perform its function at a distance in the tens of microns above the surface of the hard disk. If the distance between the r/w head and the disk gets too small, if impurities form on the surface of the disk, or if the head moves too much in a vertical direction towards the disk, the r/w head can impact on the surface of the disk, causing damage to the head and the disk. This undesired collision is called a head crash.

In addition, for the r/w head to operate properly, it must also be moved to the desired track and sector of the disk within a narrow horizontal range as well. Too much horizontal displacement can cause the r/w head to be improperly aligned over the desired track and sector. A horizontal displacement of as little as 8 microns can cause the disk drive to fail to operate properly.

An inherent limitation in the read/write process is the fact that the actuator arm and the r/w head will oscillate slightly in a horizontal direction as they move back and forth. Since the r/w head must stay very small margin of horizontal movement when seeking a particular track, the oscillation must be kept to within a very small tolerance. Too much oscillation will result in the very real possibility of an improper alignment of the r/w head during a point of maximum oscillation, meaning a failure to read or write data properly.

In order to ensure upper operation of the hard disk drive it is known from the prior art to measure the gram load which is exercised by the head gimbal assembly onto the disk when the disk is not in motion. In operation the head takes off because of the lift which is caused by the movement of the disk. This way a balance is constituted between the lift force and the gram load such that the head is at a defined attitude over the disk.

This testing method has some disadvantages. One disadvantage is, that the testing cannot be performed in situ but needs to be performed before the assembly of the disk drive. During the assembly process the mechanical properties of the head gimbal assembly can change. Another disadvantage of this prior art testing method is that only the static case is tested but not the impact of dynamic loads which occur when the actuator arm moves the head to different tracks.

U.S. Pat. No. 5,979,249 shows an actuator resonance tester for a disk drive. The tester includes an actuator arm, a pivot, one or more weights, a voice coil, a voice coil motor, an accelerometer, and a processor. The one or more weights are formed on the actuator arm to simulate the mass of at least one read/write head.

The base and the test housing are affixed to either end of the pivot to provide it with proper boundary conditions to simulate the boundary conditions of a fully-assembled hard disk drive device. The voice coil and the voice coil motor move the actuator arm rotationally around the pivot. The accelerometer is placed on the actuator arm to measure the horizontal acceleration of the actuator arm. The processor determines the resonance of the actuator arm based on the arm's measured horizontal acceleration. One of the disadvantages of this tester is that in situ testing is not possible.

WO 01/18 557 shows a method for testing disk drive read/write heads. The testing is performed by writing information to and reading information from a non-disc shaped media paddle that is caused to move back and forth with respect to the read/write head on oscillatory fashion.

In the past, the actuator resonance has been measured through the use of a laser-based testing system, comprising a laser Doppler vibrometer, a digital signal analyzer, a precise x-y-z fixture, and a high-fidelity power amplifier. An example of this conventional method is shown in "Drive Level Slider-Suspension Vibration Analysis And its Application to a Ramp-Load Magnetic Disk Drive," by Ta-Chang Fu, et al., IEEE Transactions on Magnetics, Vol. 31, No. 6, (November 1995), the contents of which are hereby incorporated by reference.

It is therefore desirable to provide an improved method and system for testing the head gimbal assembly which does also encompass the dynamic case when the disk drive is in operation.

SUMMARY OF THE INVENTION

The present invention provides for a method for testing a head gimbal assembly which enables in situ testing under real life operating conditions. The testing can be performed either right after head gimbal assembly using a single disk application. At this point in situ correction can be applied to get the mechanical properties of the set up back into an expected, specified range.

Alternatively or in addition testing can be performed after head stack assembly using a disk stack application and the finished actuator. At this point a damaged head gimbal assembly can be replaced before the actuator gets assembled into the hard disk drive.

In accordance with a preferred embodiment of the invention a laser measurement system is employed in order to measure the oscillation of the head gimbal assembly caused by the mechanical excitation. For example a laser Doppler vibrator (LDV) measurement system can be utilized for this purpose.

In accordance with a preferred embodiment of the invention the laser beam of the laser measurement system is directed onto the head gimbal assembly in a transversal direction. Preferably the laser beam is focused on the slider edge in order to include slider vibration into the measurement.

In accordance with a further preferred embodiment of the invention a mechanical property of the head gimbal assembly is adjusted in order to bring the measured mechanical frequency response into better compliance with the master frequency response. The adjustment of the mechanical property can be performed by weakening the suspension of the head gimbal assembly or by adding a dampening element.

DETAILED DESCRIPTION OF THE INVENTION

Figure 1:
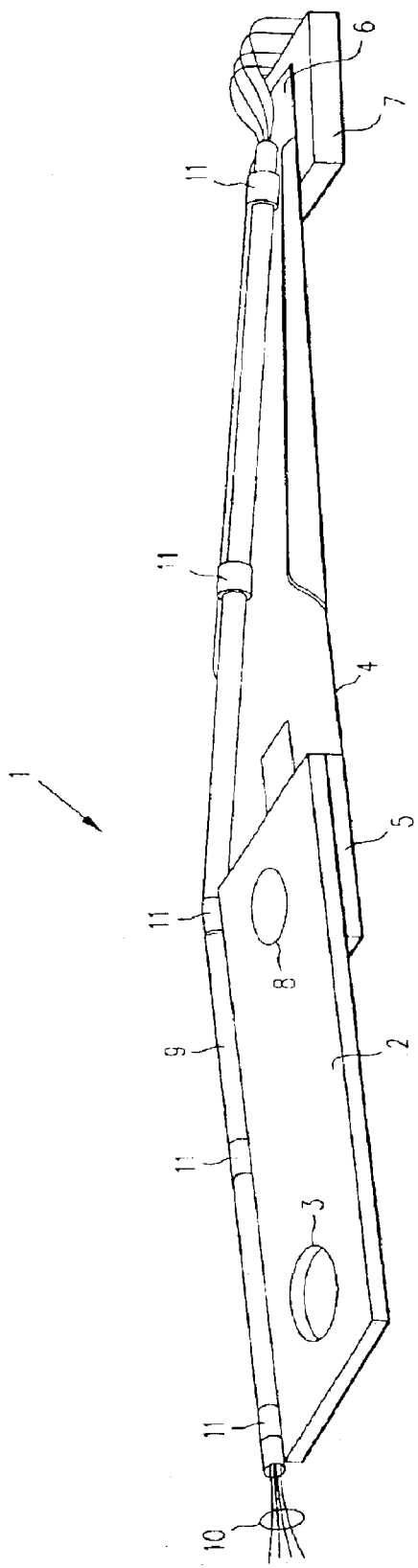
FIG. 1 shows a prior head supporting arm.
Figure 2:
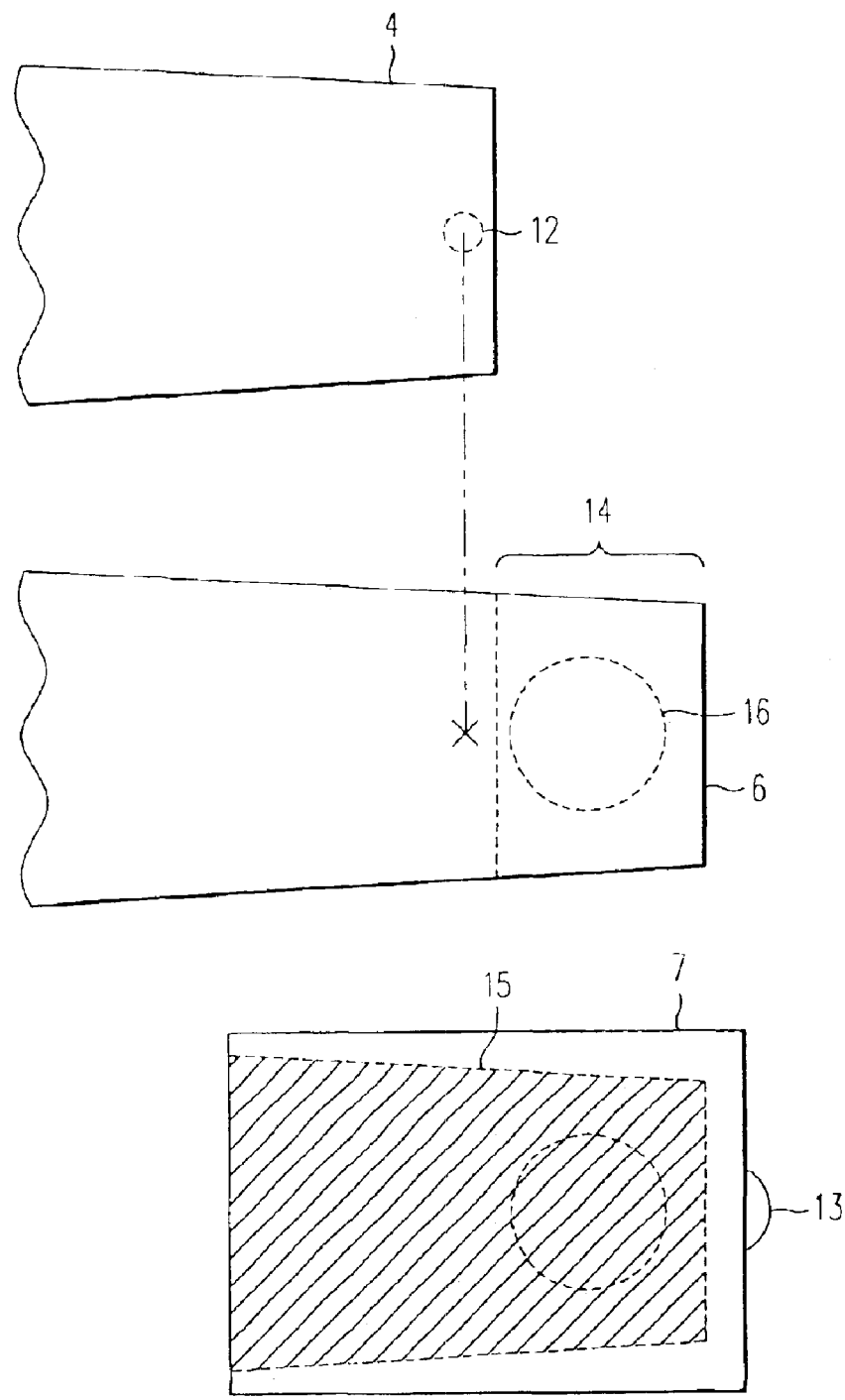
FIG. 2 shows a positional relation ship of a front end of the load beam, the flexure and the slider.
Figure 3:
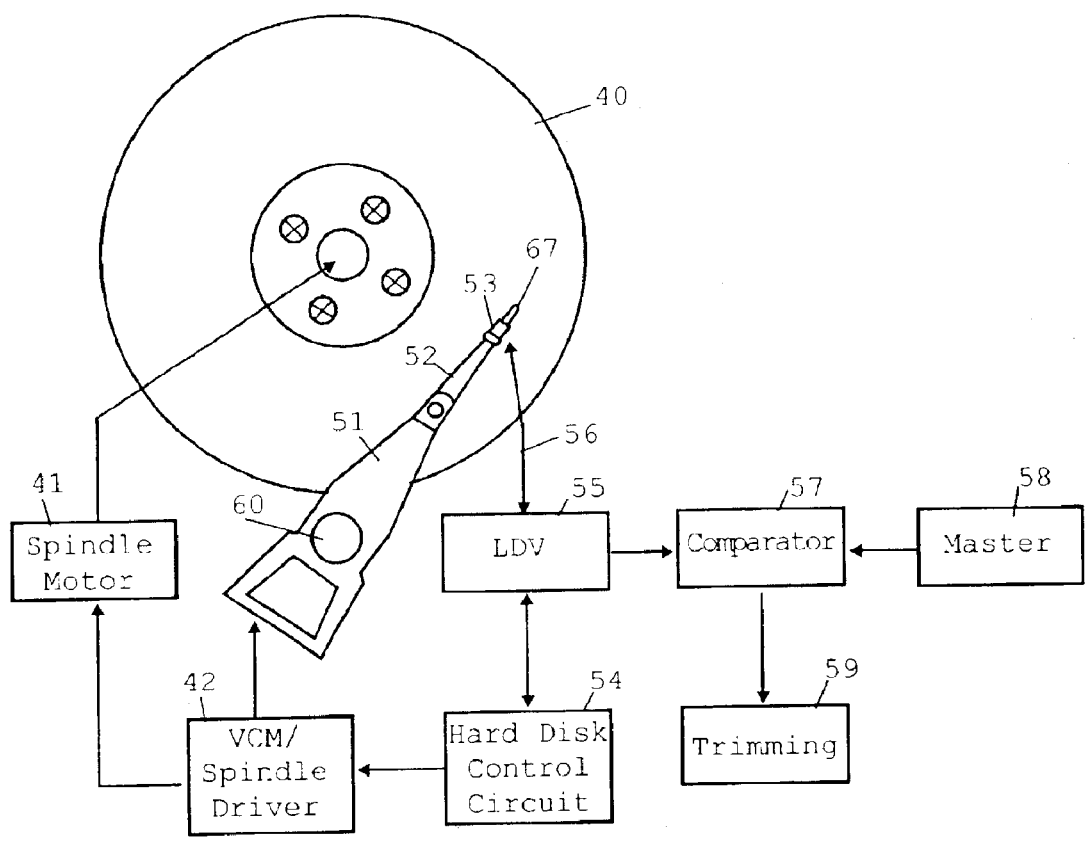
FIG. 3 shows a block diagram of a hard disk drive and of a test system in accordance with the present invention.

FIG. 3 shows a block diagram of a hard disk drive with a head gimbal assembly which includes a head supporting arm 51, a load beam 52 and a read/write head 67 mounted on a slider 53.

A spindle motor 41 for rotating the magnetic data recording disk 40 and a voice coil motor (VCM) are controlled by a VCM/spindle driver 42. Only one magnetic recording disk 40 is shown for simplifying the drawing.

The driver 42 is controlled by the hard disk control circuit 54. Further hard disk control circuit 54 is coupled to laser measurement system 55, such as a LDV system. The laser measurement system 55 directs a laser beam 56 onto the slider 53 into a direction which is transversal to the oscillation of the head gimbal assembly as will be explained in more detail in the following.

The laser measurement system 55 is coupled to a comparator 57 and the comparator 57 is coupled to storage 58 where a master frequency response curve is stored. An output of the comparator 57 is coupled to trimming device 59.

For testing the head gimbal assembly the head supporting arm 51 is rotated around axis 60 in order to bring the head gimbal assembly into a defined position such as the inner or the outer diameter of disk 40.

A control command is inputted into the hard disk control circuit 54 in order to perform a long seek operation or a full seek operation. This means that the head supporting arm 51 is abruptly actuated to perform an angular movement around axis 60 For example the bead gimbal assembly is first moved to the inner diameter of the disk 40 and the laser beam 56 is focused on the slider 53.

Next a control command is inputted into the hard disk control circuit 54 in order to perform a long or a full seek operation, i.e. to move the head 67 to the outer diameter of the disk 40.

This results in a mechanical excitation of the head gimbal assembly which leads to oscillation. The amplitude and/or angular velocity of the oscillation performed by the head gimbal assembly is measured by means of the laser beam 56 which is directed on the side of slider 53. Further a Fourier transformation of the measured oscillation is performed and inputted into comparator 57 from the laser measurement system 55.

Comparator 57 compares the mechanical frequency response curve provided by the laser measurement system 55 to the master frequency response stored in storage 58. In case of a discrepancy between the mechanical frequency response as measured and the master frequency response a required adjustment of the head gimbal assembly is determined and outputted from the comparator 57 to trimming device 59.

Figure 4:
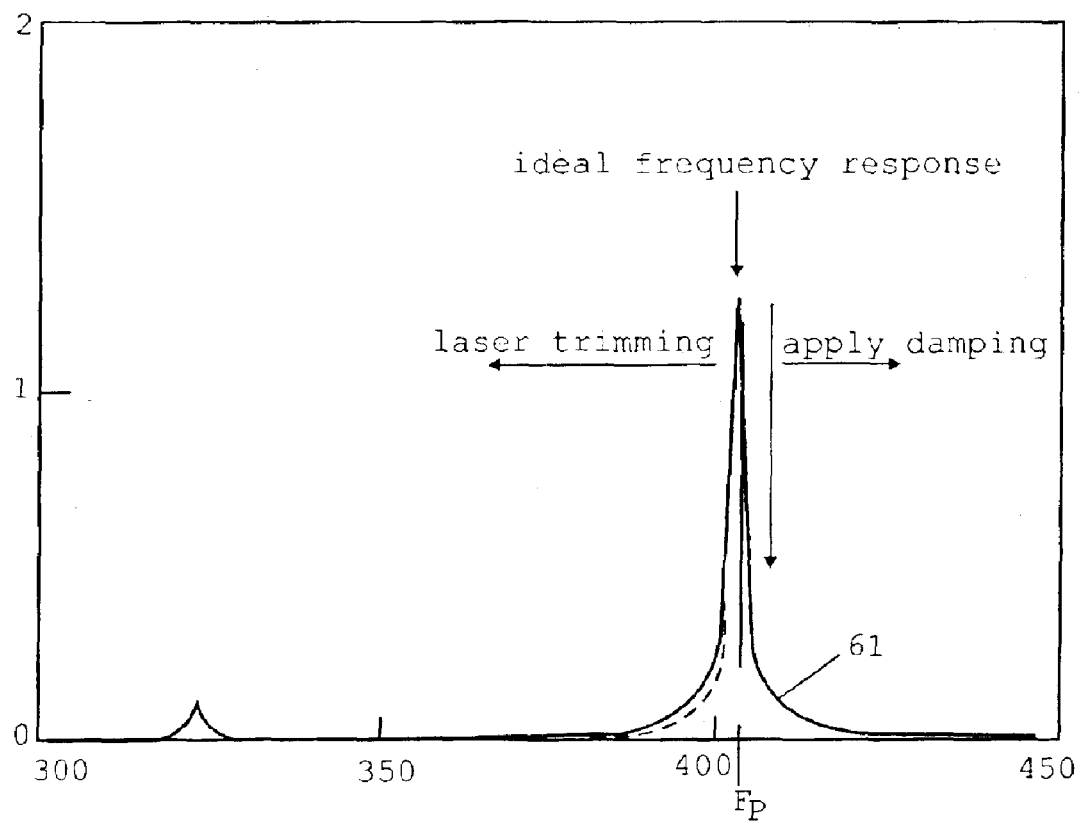
FIG. 4 shows a master frequency response.

FIG. 4 shows a master frequency response curve 61 which is stored in storage 58. The master frequency response curve is shown in an x/y coordinate system where x is the mechanical oscillation frequency in Hz and the y axis shows the angular velocity of the mechanical oscillation. The master frequency response curve 61 has a certain peak frequency $F_P$ in the region of 400 Hz.

When the peak frequency of the measured mechanical frequency response is below the frequency $F_P$, this means that the head gimbal assembly needs to be dampened additionally. In this instance a dampening element can be added onto load beam 52.

In the opposite case, i.e. when the peak frequency of the measured mechanical frequency response is above $F_P$, the load beam 52 needs to be weakened in order to move the actual peak frequency into the direction of the peak frequency $F_P$.

Figure 5:
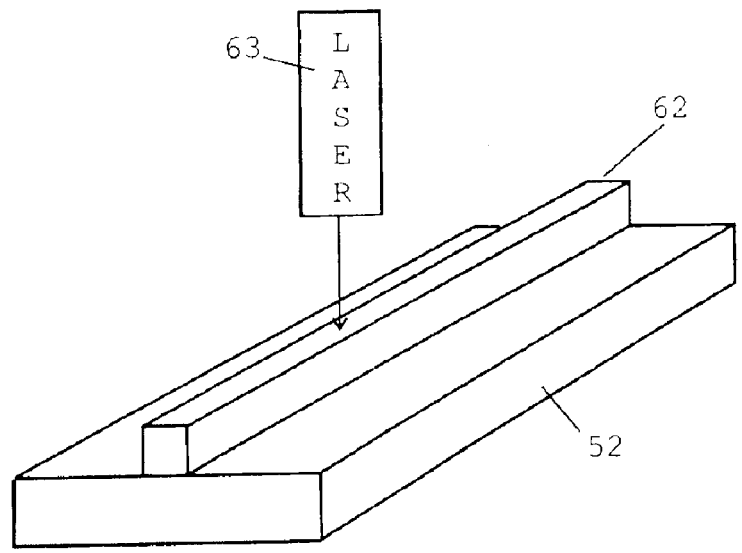
FIG. 5 shows a load beam having a sacrificial bar.

FIG. 5 shows a schematic view of the load beam 52. The load beam 52 has a bar 62. Portions of the bar 62 can be removed selectively by means of a trimming laser 63.

For example the load beam 52 is fabricated of stainless steel whereas bar 62 is fabricated of a material which is easily evaporated by means of trimming laser 63, such as titanium.

Figure 6:
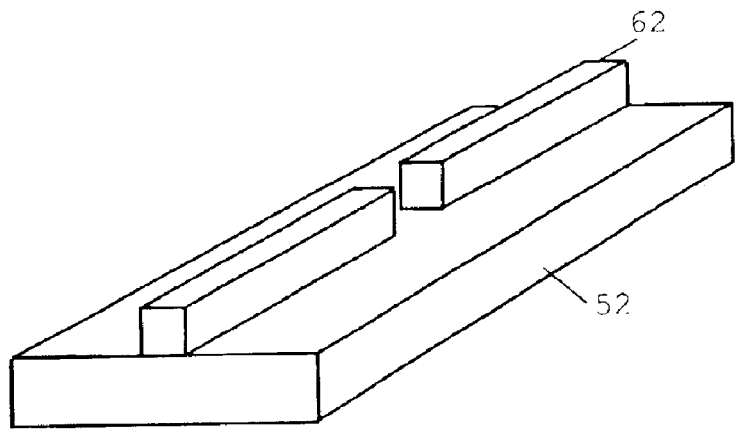
FIG. 6 shows the load beam of FIG. 5 after a portion of the sacrificial bar has been removed.

FIG. 6 shows the result of such a trimming operation where a portion of the bar 62 has been removed by means of laser 63. After this adjustment the test can be performed again and further adjustment can be made iteratively until the measured mechanical frequency response and in particular the measured peak frequency is sufficiently in compliance with the master frequency response and in particular with the frequency $F_P$.

Figure 7:
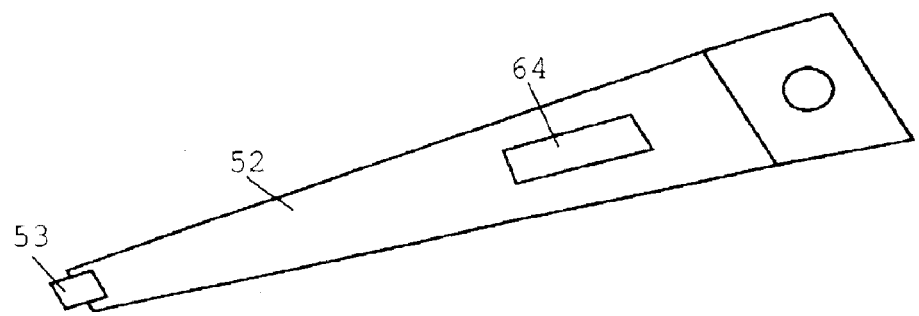
FIG. 7 shows the load beam with an additional damping element.

FIG. 7 shows load beam 52 with an additional damping element 64. The damping element serves to strengthen the load beam 52 in order to move the resonance frequency to a higher frequency into the direction of $F_P$. For example the dampening element 64 can be deposited on load beam 52 by means of vapor deposition or the like.

What is claimed is:

1. A method for testing a head gimbal assembly, comprising:
   inputting a control command to perform a long or a full seek operation;
   measuring a frequency response of the head gimbal assembly to the control command with a laser measurement system; and
   comparing the frequency response to a master frequency response.

2. The method of claim 1, further comprising the step of positioning the head gimbal assembly at a predefined position before inputting the control command.

3. The method of claim 2, further comprising the step of measuring an oscillation of the head gimbal assembly after inputting the control command and performing a fourier transformation of the measured oscillation in order to obtain the frequency response.

4. The method of claim 1, further comprising the step of measuring an oscillation of the head gimbal assembly after inputting the control command and performing a fourier transformation of the measured oscillation in order to obtain the frequency response.

5. The method of claim 1, wherein a laser of the measurement laser system is directed into a transversal direction onto the head gimbal assembly for measurement of the oscillation.

6. The method of claim 1, further comprising the step of adjusting a mechanical property of the head gimbal assembly for shifting the frequency response into the direction of the master frequency response.

7. The method of claim 6, wherein the step of adjusting a mechanical property is performed by weakening the head gimbal assembly or by adding a dampening element.

8. A system for testing a head gimbal assembly, the system comprising:
   means (54) for inputting a control command to perform a long seek operation;
   means (55) for measuring a mechanical frequency response of the head gimbal assembly to the long seek operation;
   means (57) for comparing the mechanical frequency response to a master frequency response (58).

9. The system of claim 8, further comprising means for measuring an oscillation of the head gimbal assembly and means for performing a fourier transformation for the measured oscillation.

10. The system of claim 9, wherein the means for measuring the mechanical frequency response comprises a laser measurement system for directing a measurement laser onto the head gimbal assembly in a transversal direction.

11. The system of claim 10, further comprising means for controlling a trimming device (59) for adjusting a mechanical property of the head gimbal assembly in order to move the mechanical frequency response in a direction of the master frequency response.

12. The system of claim 9, further comprising means for controlling a trimming device (59) for adjusting a mechanical property of the head gimbal assembly in order to move the mechanical frequency response in a direction of the master frequency response.

13. The system of claim 8, wherein the means for measuring the mechanical frequency response comprises a laser measurement system for directing a measurement laser onto the head gimbal assembly in a transversal direction.

14. The system of claim 13, further comprising means for controlling a trimming device (59) for adjusting a mechanical property of the head gimbal assembly in order to move the mechanical frequency response in a direction of the master frequency response.

15. The system of claim 8, further comprising means for controlling a trimming device (59) for adjusting a mechanical property of the head gimbal assembly in order to move the mechanical frequency response in a direction of the master frequency response.

16. The system of claim 15, the trimming device comprising a trimming laser.

17. A head gimbal assembly, comprising a trimming element (62) for adjusting a mechanical property in order to approximate a frequency response of the head gimbal assembly to a master frequency response.

18. The head gimbal assembly of claim 17, wherein the trimming element is adapted to be selectively removed by means of a trimming laser.

* * * * *